(12) United States Patent
Griffith

(10) Patent No.: US 7,264,755 B2
(45) Date of Patent: Sep. 4, 2007

(54) LENS MOLDING APPARATUS AND RELATED METHODS

(75) Inventor: Saul Griffith, Cambridge, MA (US)

(73) Assignee: Low Cost Eyesglasses, Inc., Washington, DC (US)

( * ) Notice: Subject to any disclaimer, the term of this patent is extended or adjusted under 35 U.S.C. 154(b) by 684 days.

(21) Appl. No.: 10/199,007

(22) Filed: Jul. 22, 2002

(65) Prior Publication Data

US 2003/0052425 A1    Mar. 20, 2003

Related U.S. Application Data

(60) Provisional application No. 60/307,052, filed on Jul. 20, 2001.

(51) Int. Cl.
    *B29D 11/00* (2006.01)
(52) U.S. Cl. .................. 264/1.1; 264/1.38; 264/2.5; 425/808
(58) Field of Classification Search .............. 264/1.1, 264/2.5, 570, 571, 313, 314, 2.2, 2.3, 1.36, 264/1.38; 425/389, 432, 808, 388; 249/65
See application file for complete search history.

(56) References Cited

U.S. PATENT DOCUMENTS

| | | | | |
|---|---|---|---|---|
| 3,632,696 A | * | 1/1972 | Jones | 264/1.1 |
| 4,038,014 A | * | 7/1977 | Dusza et al. | 425/388 |
| 4,094,109 A | * | 6/1978 | Prouvost | 52/2.19 |
| 4,447,372 A | * | 5/1984 | Kreuttner | 264/2.2 |
| 4,540,532 A | * | 9/1985 | Petcen et al. | 264/1.1 |
| 4,890,903 A | * | 1/1990 | Treisman et al. | 359/666 |
| 6,364,648 B1 | * | 4/2002 | Bishop et al. | 425/125 |

FOREIGN PATENT DOCUMENTS

JP        59-171627    *    9/1984

* cited by examiner

*Primary Examiner*—Mathieu D. Vargot
(74) *Attorney, Agent, or Firm*—DLA Piper US LLP

(57) ABSTRACT

An adjustable mold includes a distortable boundary, a flexible membrane, and a pressurizer, and method of use thereof. Pressure is applied to the flexible membrane, which causes the membrane to distort over the boundary. The shape of the boundary and the distortion of the flexible membrane control the optical characteristics of a lens resulting from the application and curing of a molding composition placed on the flexible membrane or to cast other items having variable shapes determined in part by the flexible membrane. In addition, a mold edge is used to allow casting in predetermined shapes, reducing need for grinding or edging. Visual and emission device calibration features used in conjunction with calibration reference images allow uniform selective distortion of the flexible membrane.

43 Claims, 16 Drawing Sheets

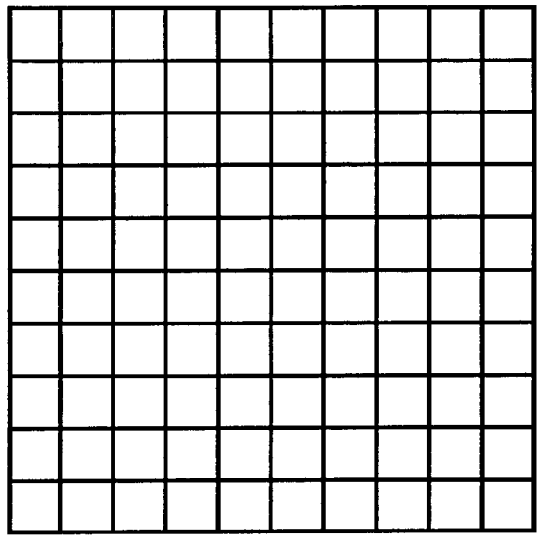
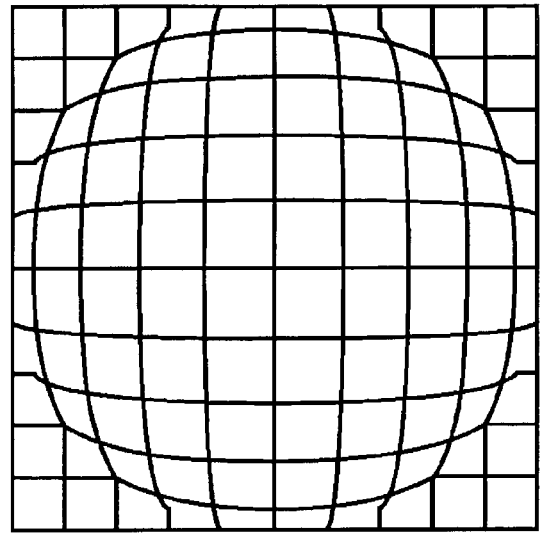
FIG. 6　　　　　　　　FIG. 7
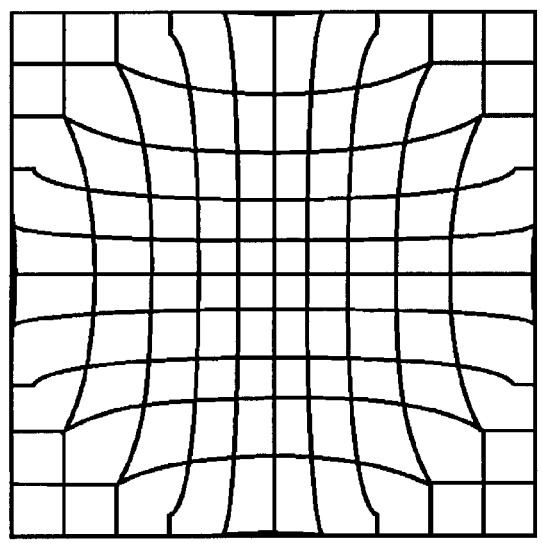
FIG. 8

FIG. 17
FIG. 16
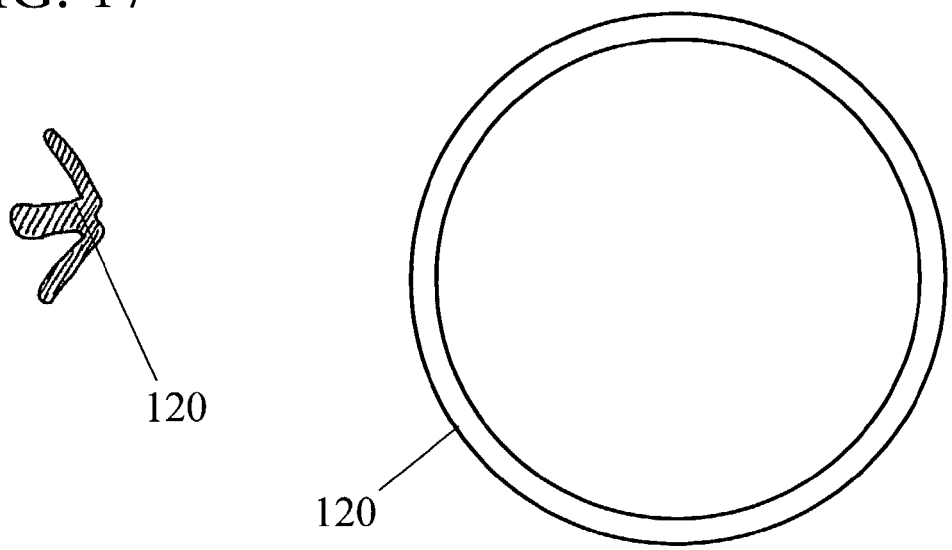
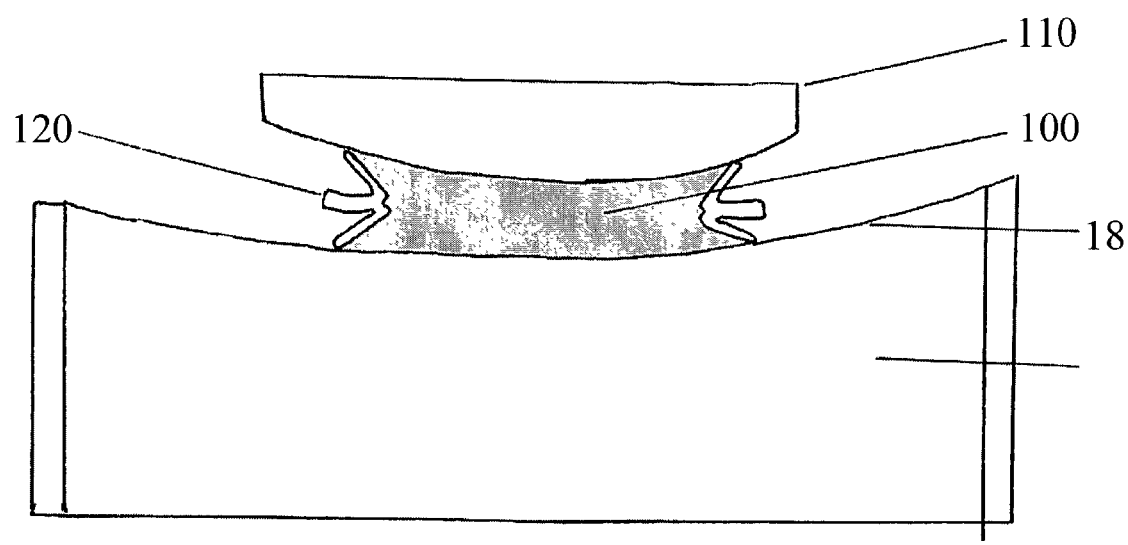
FIG. 18

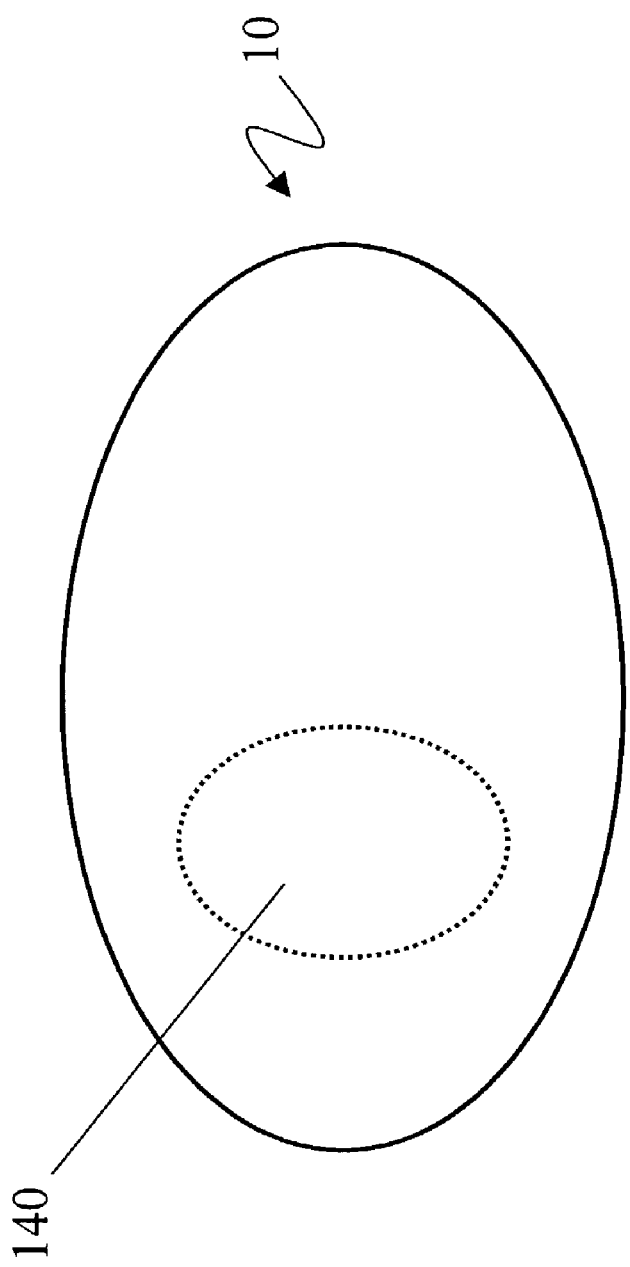
FIG. 21
FIG. 22

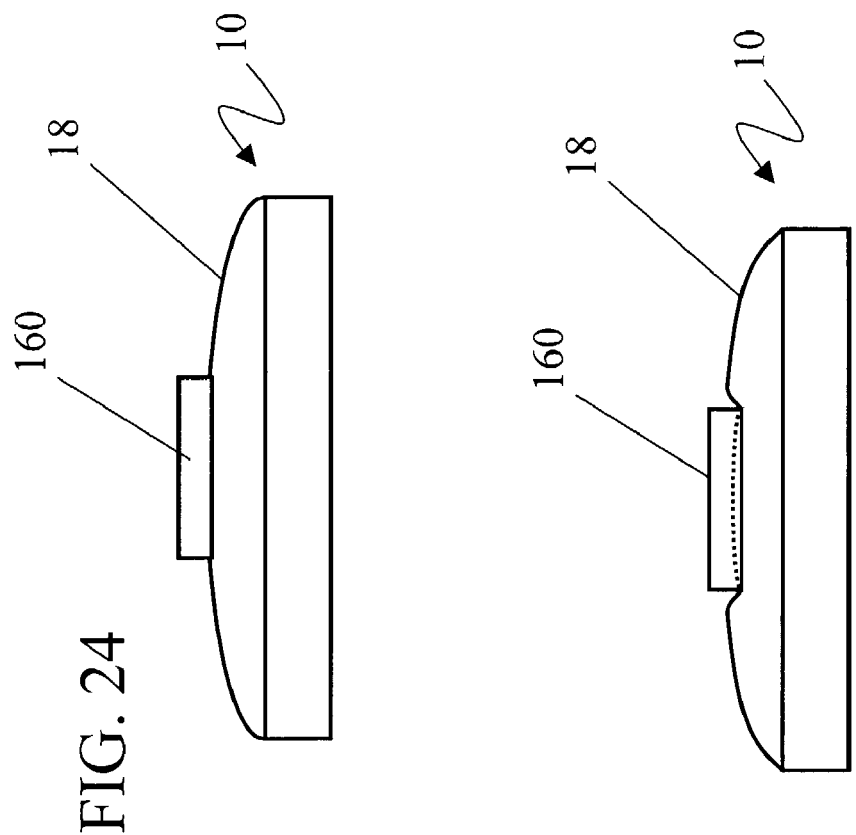
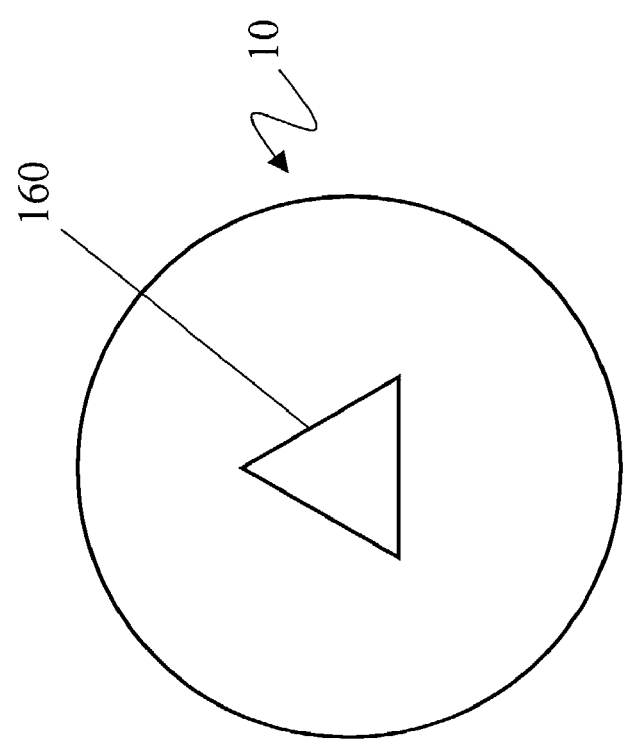

LENS MOLDING APPARATUS AND RELATED METHODS

This application claims priority from U.S. Provisional Patent Application Ser. No. 60/307,052, filed Jul. 20, 2001. The entirety of that provisional application is incorporated herein by reference.

BACKGROUND OF THE INVENTION

1. Field of the Invention

The invention relates generally to molds, and, more specifically, to adjustable mold surfaces for casting eyeglass lenses.

2. Background of the Technology

The United Nations and other organizations have estimated that at least one billion people in the world require corrective lenses but do not have access to them. This unmet need arises, in part, from the cost of lens-manufacturing laboratories and distribution. For example, the typical lens-manufacturing facility maintains separate, expensive molds for each of a wide range of possible optical lens prescriptions.

One proposed solution to this problem is the use of a single adjustable lens. In other words, the optical characteristics of each lens can be varied after manufacturing. A pair of adjustable lenses can be integrated into an eyeglass frame to provide a wide range of sight correction. However, drawbacks of this approach include increases in the overall cost of eyeglasses, and added complexity. In addition, this approach does not generally cover the entire prescriptive range.

There is also a similar general need for apparatuses and methods for forming other items from molds, in which easily adjustable mold variation can be made.

SUMMARY OF THE INVENTION

The present invention includes apparatuses and methods of use for a unitary, low-cost mold that can be used to manufacture a variety of articles, including lenses, such as corrective eyeglass lenses, and other manufactured items. The mold can be manipulated, for example, to span the range of lenses required to correct a large variety of imperfections in the human eye. For use in manufacturing items, the mold is adjustable during the manufacturing process, so as to allow variations in molded items.

In one aspect, the invention relates to a mold that includes a distortable annulus (also interchangeably referred to herein as a distortable boundary) having a rim and defining an interior region, a flexible membrane disposed against the rim and covering an interior region of the boundary, and a pressurizer for distorting the membrane relative to the boundary. The distortable membrane cooperates with the boundary rim to create a mold with a shape profile dictated by the rim shape and a depth profile determined by the distorted membrane.

In certain embodiments, the pressurizer includes a liquid or a gas medium in cooperation with features for controlling the applied pressure within a chamber enclosing the boundary. Part of the chamber is defined by the flexible membrane.

Embodiments of the present invention further include use of a rigid or flexible mold edge, also referred to herein as a gasket, which, when placed upon the distorted flexible membrane, allows a lens or other item to be formed therein. Other embodiments include use of other boundary devices and varying pressures on the boundary devices to produce a wide range of complex shapes and surface characteristics via the flexible membrane. For example, by applying pressure upon an asymmetrical boundary device, surface variations occur for the membrane, which are then transferrable, for example, to a lens or manufactured item formed thereupon.

Embodiments also include a second surface form for bounding the surface opposite the distorted flexible membrane for the item to be formed. In alternative embodiments, a second flexible membrane is used to form the opposite surface to the surface formed by the first flexible membrane.

Embodiments of the present invention further include various features for controlling or otherwise making distortion uniform via the flexible membrane. For example, some embodiments include use of an emission, such as from a laser or other optical device, passed through an aligning guide (e.g., waveguide) for projecting an image via the emission. The projected image is then passed through the membrane, which distorts the image, and the distorted image is compared to a calibration reference image. The membrane is then variably distorted, for example, so as to vary the projected image until it matches the calibration reference image, thereby producing a predetermined distortion in the membrane.

Alternatively, light reflected off an alignment pattern and producing an image upon passing through the membrane and an image pattern (e.g., a grid in a reticle) is viewed, and the membrane is distorted so as to bring the reflected image into uniformity with the image pattern, thereby producing a predetermined distortion in the membrane.

In another aspect, the present invention is directed to a method of forming a lens. A flexible membrane is disposed over a boundary having a definable shape to cover an interior region of the boundary. The flexible membrane is distorted by applying a positive or a negative pressure to the membrane. A lens with a shape dictated by the boundary rim and a depth profile dictated by the flexible membrane is formed by curing a precursor applied to the interior region of the membrane, further bounded, for example, by use of a mold edge and a form for forming sides and a surface opposite the membrane formed surface.

Additional advantages and novel features of the invention will be set forth in part in the description that follows, and in part will become more apparent to those skilled in the art upon examination of the following or upon learning by practice of the invention.

DESCRIPTION OF THE FIGURES

In the drawings:

FIG. 6 illustrates an undistorted reference image used to calibrate a mold constructed in accordance with an embodiment of the present invention;

FIG. 7 shows a reference image used to produce a positive curvature lens from a mold constructed in accordance with an embodiment of the present invention;

FIG. 8 presents a reference image used to produce a negative curvature lens from a mold constructed in accordance with an embodiment of the present invention;

FIG. 16 shows an overhead view of a second example of a mold edge, in accordance with an embodiment of the present invention;

FIG. 17 is a cross-sectional view of a portion of a side of the mold edge of FIG. 16;

FIG. 18 presents a cross-sectional view of the mold, showing the second example mold edge sandwichably placed between the flexible membrane and a second surface form, in accordance with an embodiment of the present invention;

FIGS. 21 and 22 contain views of a second example second surface form having a concave depression, in accordance with an embodiment of the present invention;

FIGS. 24 and 25 present views of an item mold having complex boundary conditions, in accordance with an embodiment of the present invention; and FIG. 26 shows a view of the item mold of FIGS. 24 and 25, in which a positive pressure is applied via a mold edge, in accordance with an embodiment of the present invention.

DETAILED DESCRIPTION

Figure 1:
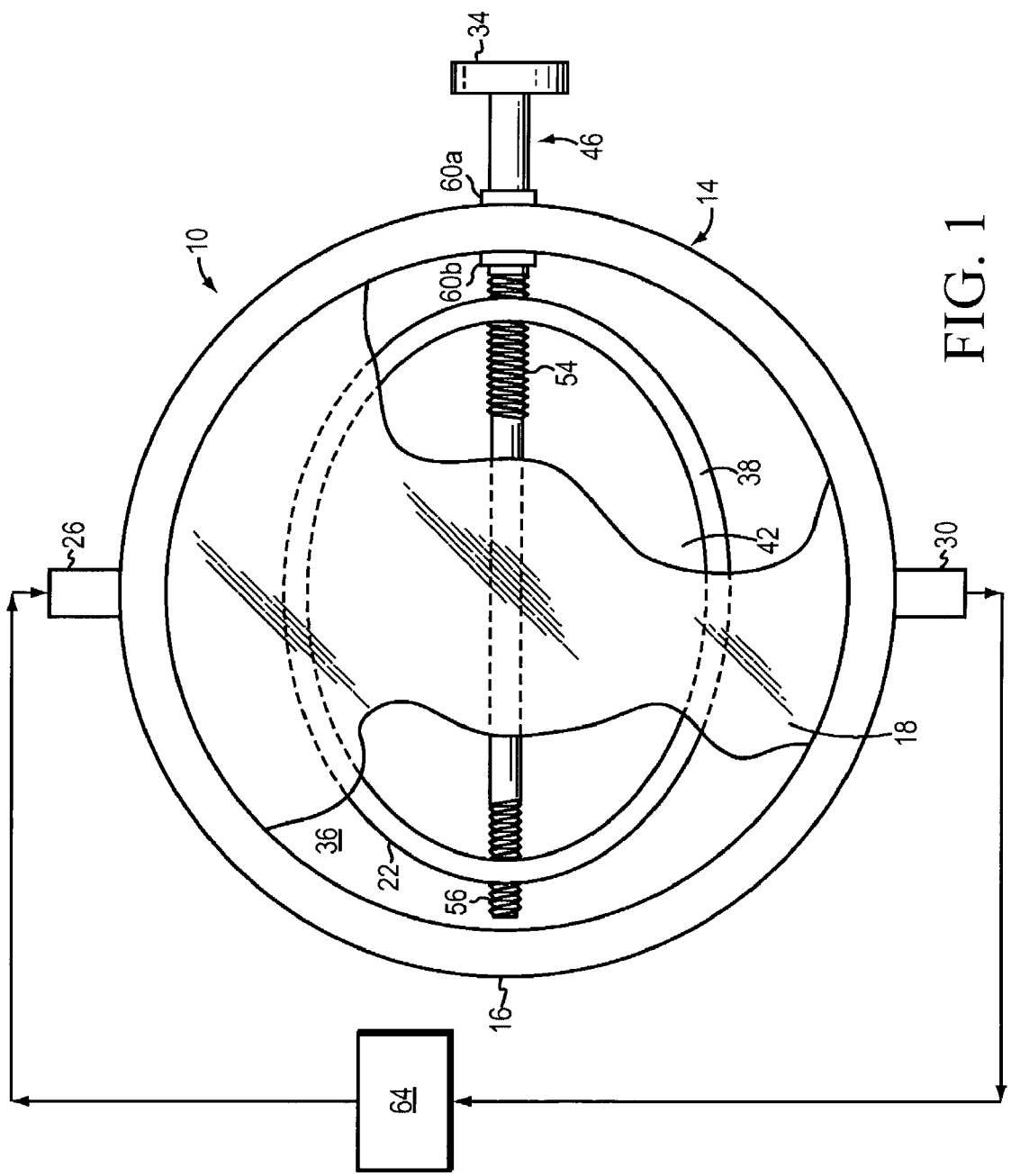
FIG. 1 is a plan view of an embodiment of the present invention.

With reference to FIGS. 1-4, in one embodiment, a mold 10 in accordance with the present invention includes a housing 14 having a generally cylindrical side wall 16 and a flexible membrane 18 extending over the side wall 16 and forming a ceiling on the housing 14. A distortable boundary 22 resides within the housing 14. An inlet valve 26 and an outlet valve 30 afford fluid communication with the interior of the housing 14. A calibrated knob 34 or other adjustable mechanism is used to distort the boundary 22.

Figure 2:
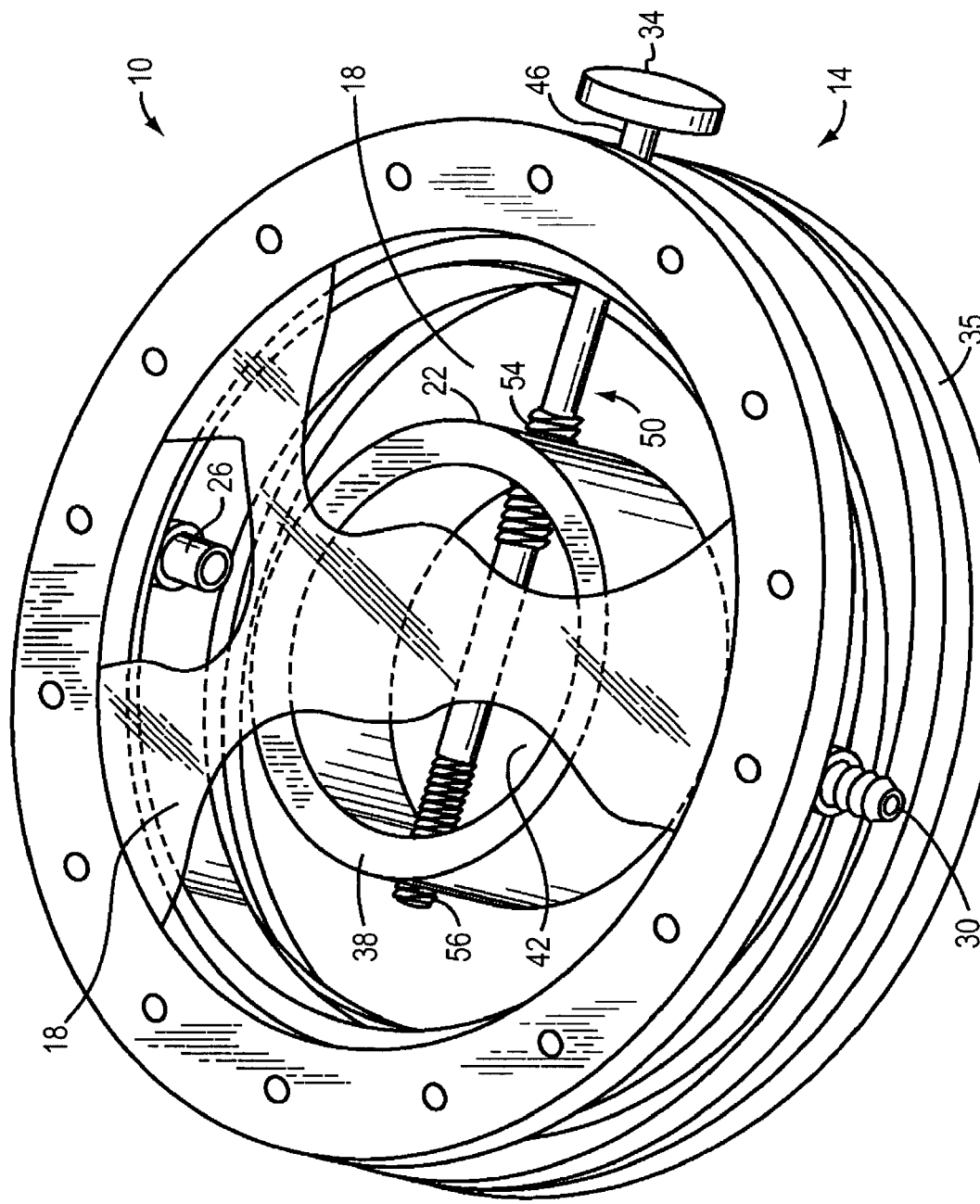
FIG. 2 is an isometric view of an embodiment of the present invention.
Figure 3:
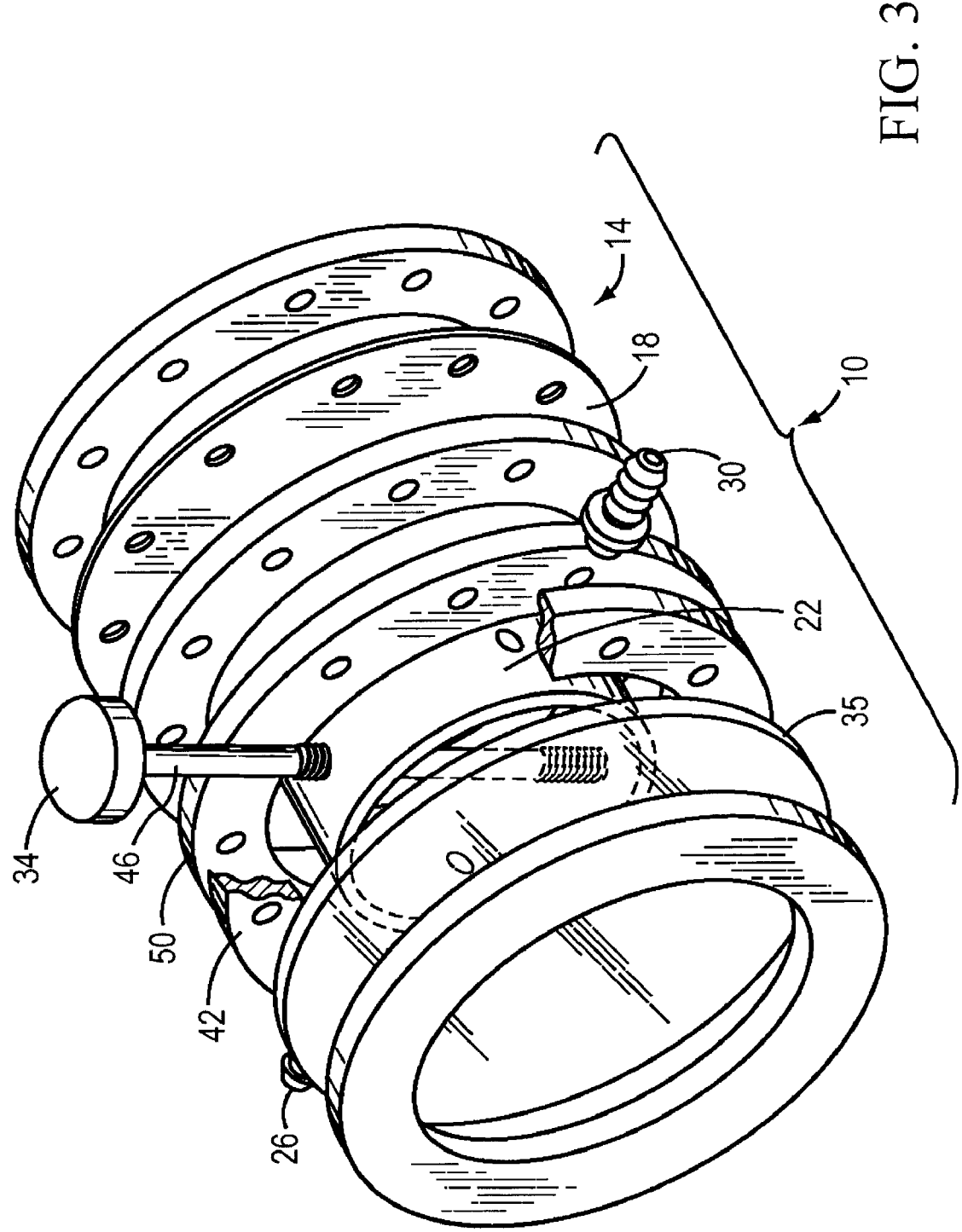
FIG. 3 is an exploded view of the embodiment of the invention of FIG. 2.

The housing 14 also includes a bottom wall 35, as shown in FIGS. 2 and 3. The membrane 18 is sealed against the side wall 16 and forms, along with the bottom and side walls of the housing 14, a fluid-tight chamber 36 inside the housing 14. As shown in FIG. 3, the mold 10 may be built up from a series of interfitting circular disks and rings. The chamber 36 is generally filled with a hydraulic fluid or a gas, which is used to control the pressure within the chamber 36 and, as a consequence, the depth of distortion of the flexible membrane 18. The distortable boundary 22 includes a rim 38 and defines an interior region 42 within the chamber 36. In the absence of distorting pressure, the flexible membrane 18 rests on or above the rim 38. If negative pressure is applied to the membrane 18 by withdrawal of fluid (i.e., liquid or gas) from the chamber 36 through the outlet valve 30, the membrane 18, where it is not supported by the rim 38, will descend below the level of the rim. As a result, a molding region or well forms within the region bounded by the rim 38. The depth of the well is determined by the characteristics of the membrane 18 and the pressure differential applied thereto, while the perimeter shape of the well is dictated by the contour of the rim 38.

Figure 4:
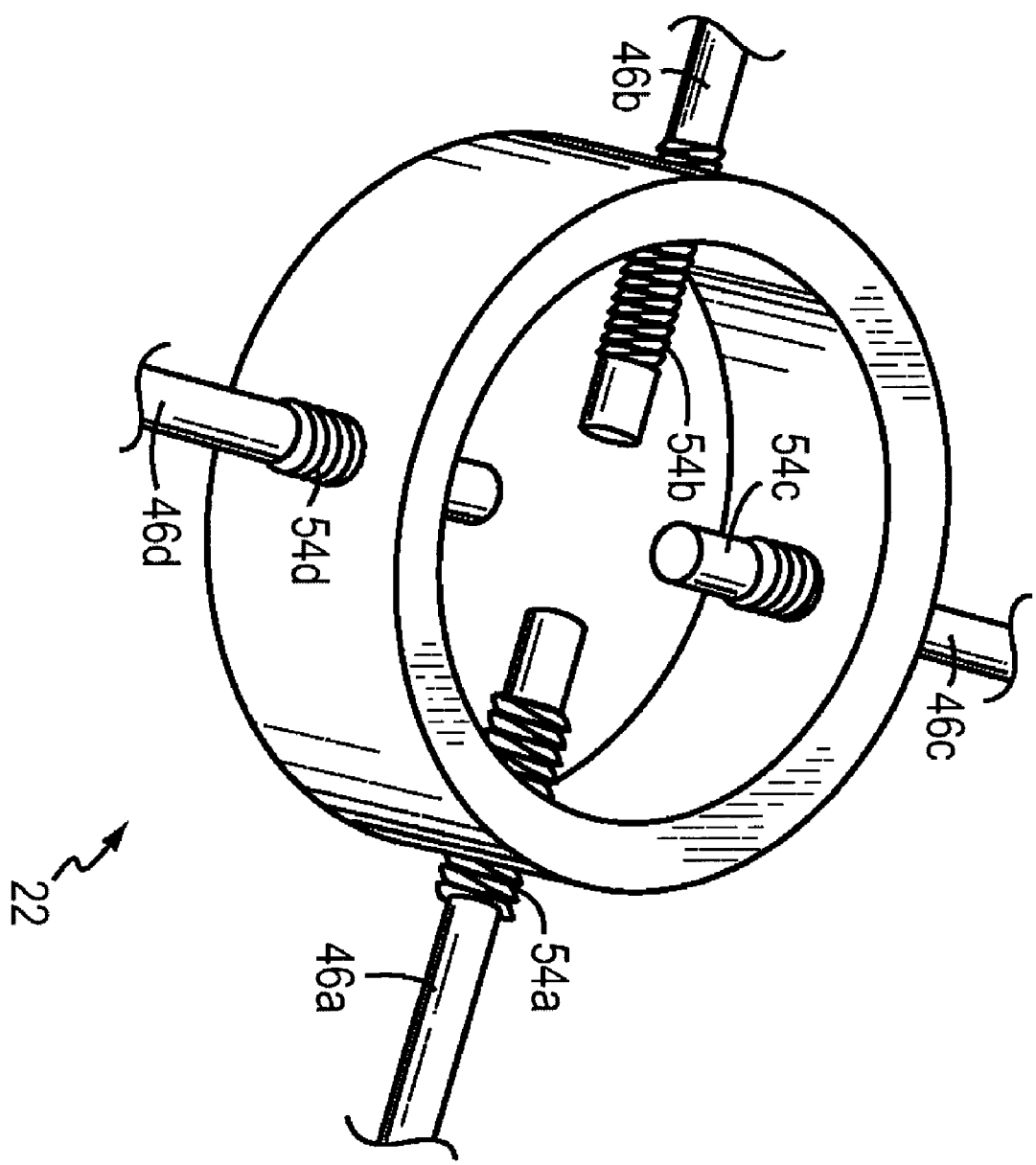
FIG. 4 is an isometric view of an embodiment of a boundary of the present invention.

In one embodiment, the shape of the boundary 22 (and, hence, the contour of the rim 38) is adjusted by a shaft 46 that includes a pair of oppositely threaded portions 54, 56. The shaft portions 54, 56 are received through threaded apertures in the boundary 22. The knob 34 is affixed to the shaft 46, and the shaft 46, is held in place relative to the chamber 14 by a pair of shoulders 60a, 60b. Rotating the knob 34 distorts the shape of the boundary 22. For example, rotation in one direction may cause the boundary to assume an ovoid shape as shown in FIG. 1, while rotation in the opposite direction may impose circularity as shown in FIGS. 2, 3, and 4 or, following further rotation, an ovoid configuration along a perpendicular orientation. Calibration markings along the surface of the knob 34 allow the user to easily select among predetermined conformations.

With reference to FIG. 4, in one embodiment, the shape of the boundary 22 is controlled by a plurality of shafts 46a, 46b, 46c, and 46d (referred to generally as 46). Each shaft 46 is received through a separate threaded aperture. Individually adjusting each of the shafts 46 results in a lens with different optical properties (e.g., magnification) along multiple axes.

With reference back to FIGS. 1-3, the inlet valve 26 and the outlet valve 30 are disposed within the housing 14 and connected to features, such as a pressure source or a vacuum source, for controlling the pressure therein. In one embodiment, pressure is controlled pneumatically. In another embodiment, pressure is controlled by adding or removing liquid from the housing 14. In yet another embodiment, only a single valve is present and connected to the source or sources.

In one embodiment, the mold 10 includes a housing 14 and a side wall 16, which are made from a relatively stiff material (e.g., a plastic such as acrylic). The mold 10 has a diameter of approximately six inches and has a depth of approximately two inches. These dimension can be scaled independently up or down, depending on the desired size of the lens or other item to be produced. The flexible membrane 18 can be made of a polyester sheet (e.g. Mylar), although other materials (e.g., thin metal, other plastics, and elastomers) can also be used. The thickness of the material of which the flexible membrane 18 is made affects the shape of the lens or other item that can be made from the mold 10. In this embodiment, the flexible membrane 18 is Mylar with a thickness of about 300 µm. Use of thicker, stiffer materials results generally in thinner lenses with a larger radius of curvature than a lens manufactured using a thinner, more pliable membrane at the same chamber pressure.

The boundary 22 can be made from polyethylene, although other deformable materials (e.g., aluminum or rubber) can also be used. The threaded portions 54, 56 can have, for example, a pitch of twenty-four threads per inch. The length of the threaded portions 54, 56 of the shaft 46 is a factor in the range of lenses that can be produced by the present invention. Also, a smaller thread pitch allows for finer adjustment of the optical characteristics of the resulting lens, and thus the spectrum of lenses is divided more finely compared to a mold with a coarser pitch. Since traditional eyeglass lens gradation is relatively coarse, lower pitch values (i.e., fewer threads per inch) are acceptable for the threaded portions 54, 56. The boundary is not meant to be limited to only two axes of adjustment, as described and depicted in this example. A plurality of adjustment axes can be incorporated without departing from the spirit and scope of the present invention.

In operation, apparatus for controlling chamber pressure 64 (e.g., a controllable air or liquid pump, a syringe, a foot pump, a bicycle pump, a hydraulic ram, a vacuum pump, or any mechanical pump) are connected to the inlet valve 26 and/or the outlet valve 30. As the pressure is adjusted within the chamber 36 of the mold 10, the flexible membrane 18 engages the rim 38 of the boundary 22, thereby creating a molding region having a shape dictated by the contour of the rim 38 and a depth profile dictated by the contour of the flexible membrane 18. Theoretically, the shape and types of lenses that can be created using the present invention are constrained by the deformation limits of the boundary 22 and the minimum energy surface that is defined by the interaction of the flexible membrane 18, the boundary 22, and the internal chamber pressure.

Adjusting the calibration knob 34 controls the shape of the boundary 22 and, in turn, the optical characteristics of the resulting lens. In one embodiment, calibration is controlled by stepper motors (not shown). In another embodiment, the mold 10 is filled with a clear liquid, which cooperates with the flexible member 18 to model the optical characteristics of the inverse of the resulting lens. In such an embodiment, the desired optical characteristics of the lens are achieved by looking through the flexible membrane 18 at an object or using other calibration mechanisms, apparatuses, or systems (see, e.g., FIGS. 5-11 and accompanying text below) and adjusting the knob 34 until the object as, for example, viewed through the inverse of the desired lens appears or is produced correctly through the flexible membrane 18.

Figure 5:
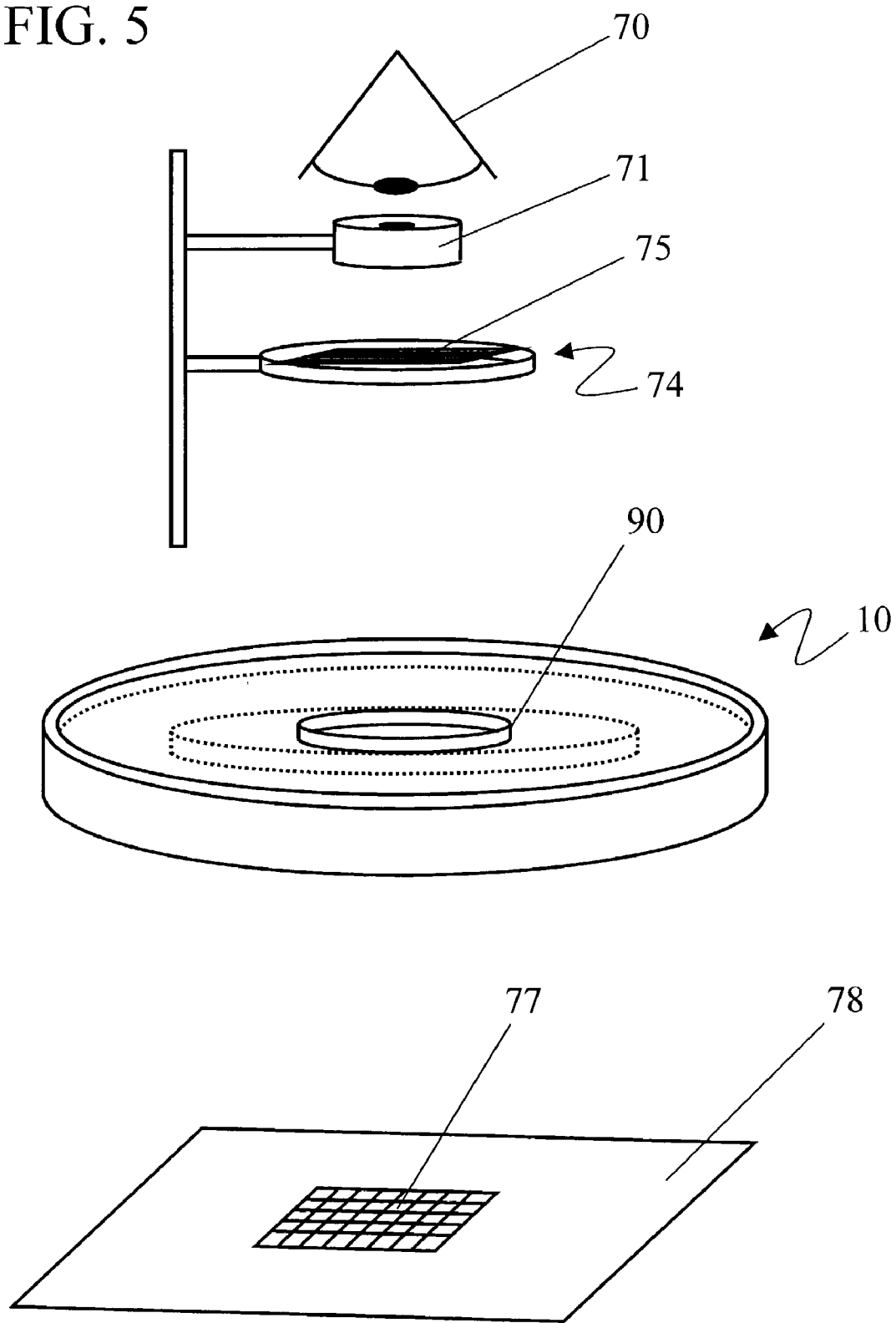
FIG. 5 presents a view of the components of a visually adjustable mold apparatus, in accordance with an embodiment of the present invention.

FIGS. 5-11 present exemplary embodiments of molds and calibrating features for adjustably distorting the mold 10, so as to allow formation of appropriate lenses or other items, in accordance with the present invention. As shown in FIG. 5, in one embodiment, an operator 70 views through a lens 71 (e.g., an eye piece and an objective lens, similar to a microscope eye piece), through a device 74, such as a calibrated reticle, containing an image pattern 75, such as a grid pattern, and further through the transparent mold 10. In this embodiment, a calibration reference image 77, such as a reference grid pattern, is viewable through the transparent mold 10. For example, in one embodiment, the calibration reference image 77 is imprinted on a projection plane 78, such as a flat surface, that is viewable through the mold 10. The calibration reference image 77 is subject to distortion as the pressure within the chamber 36 and the annulus (boundary) conditions are varied.

In an embodiment of the present invention, in order to calibrate the shape of the mold 10, the calibration reference image 77, as viewed through the mold 10, is superimposedly compared to the image pattern 75. Examples of calibration reference images 77 usable in conjunction with embodiments of the present invention include, but are not limited to, those depicted in FIGS. 6-10.

Figure 9:
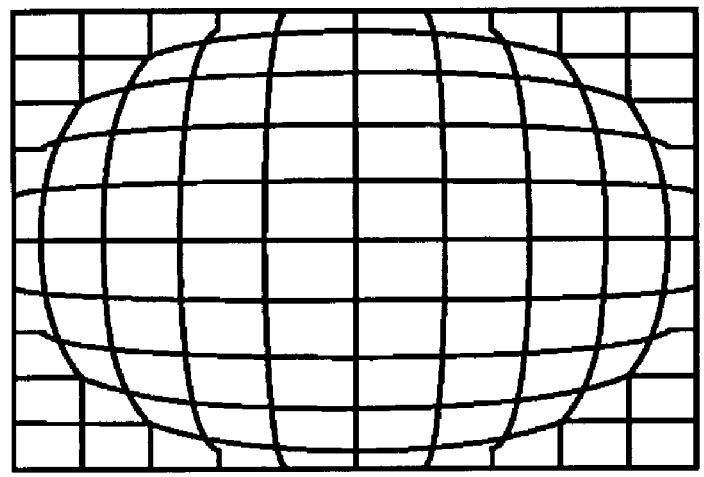
FIG. 9 contains a reference image used to produce an astigmatic lens from a mold constructed in accordance with an embodiment of the present invention.
Figure 10:
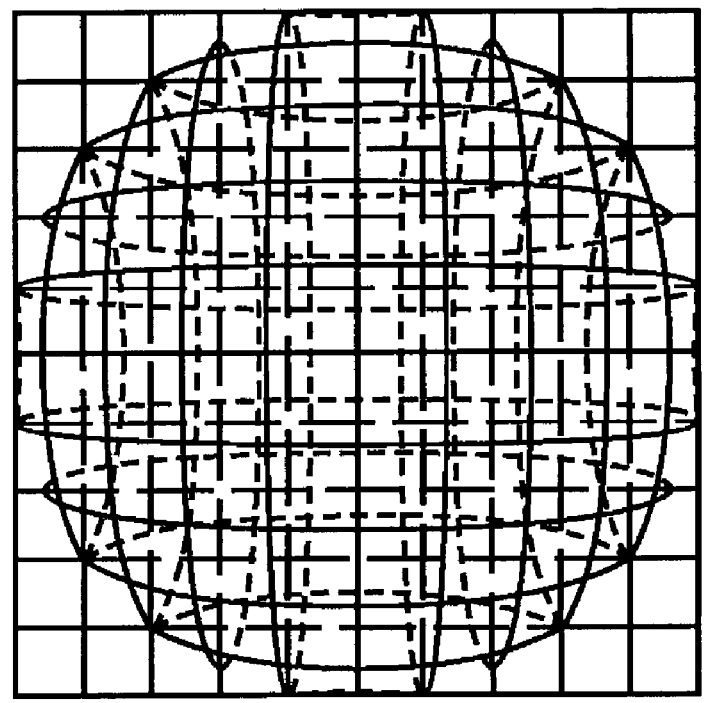
FIG. 10 shows a composite reference image used to create a variety of lenses from a mold constructed in accordance with an embodiment of the present invention.

As shown in FIG. 5, aligning the image pattern 75 with the calibration reference image 77 signifies that the proper shape and depth of the flexible-membrane 18 is achieved. The example grid image shown in FIG. 6 is used, for example, to determine that the undistorted mold 10 is properly calibrated. The example grid image of FIG. 7 is used, for example, to cast a lens with a positive curvature, while the example grid image of FIG. 8 is used to cast a lens with a negative curvature. FIG. 9 shows an example grid image used to create an astigmatic lens. FIG. 10 is an example comparative or graduated reference grid image, in accordance with an embodiment of the present invention that incorporates the principles of the individual reference images of FIGS. 6-9, with successive sets of lines corresponding to varying powers of the lens produced. As is known in the art, the reference grid images shown in FIGS. 6-10 can be scaled and varied, as necessary, to facilitate producing a wide range of corrective lenses, limited by the adjustment limits of the mold 10.

Figure 11:
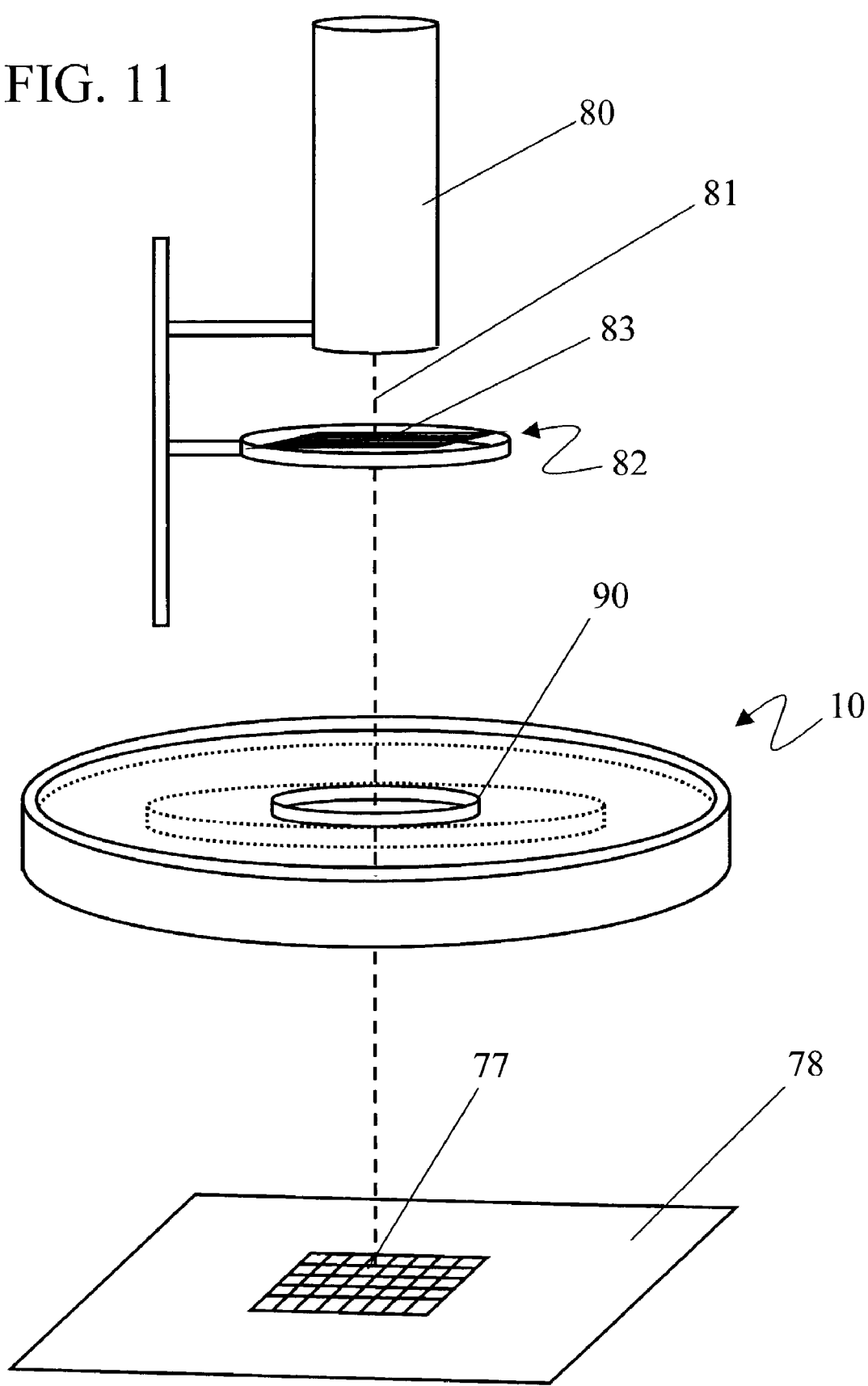
FIG. 11 presents a view of the components of an adjustable mold apparatus utilizing emission based calibration, such as laser emission based calibration, in accordance with an embodiment of the present invention.

FIG. 11 presents a view of the components of an adjustable mold apparatus utilizing emission based calibration, such as laser emission based calibration, in accordance with an embodiment of the present invention. As shown in FIG. 11, an emission device 80, such as a diode laser or other coherent light source, produces an emission 81, such as a laser beam. The emission 81 is directed through a projected image producing device 82 having an alignment guide 83, such as a patterned diffraction grating, and through the mold 10, which has a clear bottom surface, to produce a projected image, such as a grid image reflected on a projection plane 78. The projection plane 78 also includes a calibration reference image 77.

The projected image is compared to the calibration reference image 77. The mold 10 acts as a lens that uniquely shapes the image produced by the transmitted emission 81, with the projected image characteristics varying, depending on the parameters defining the surface of the flexible membrane 18, which thereby distorts the transmitted emission 81. For example, in one embodiment, the flexible membrane 18 of the mold 10 can be variably distorted via the adjusting knob 34 so as to vary the projected image produced on the projection plane 78 until the projected image matches the calibration reference image 77. The desired surface of the flexible membrane 18 has thus been "programmed," and the mold is ready for casting a lens.

Figure 12:
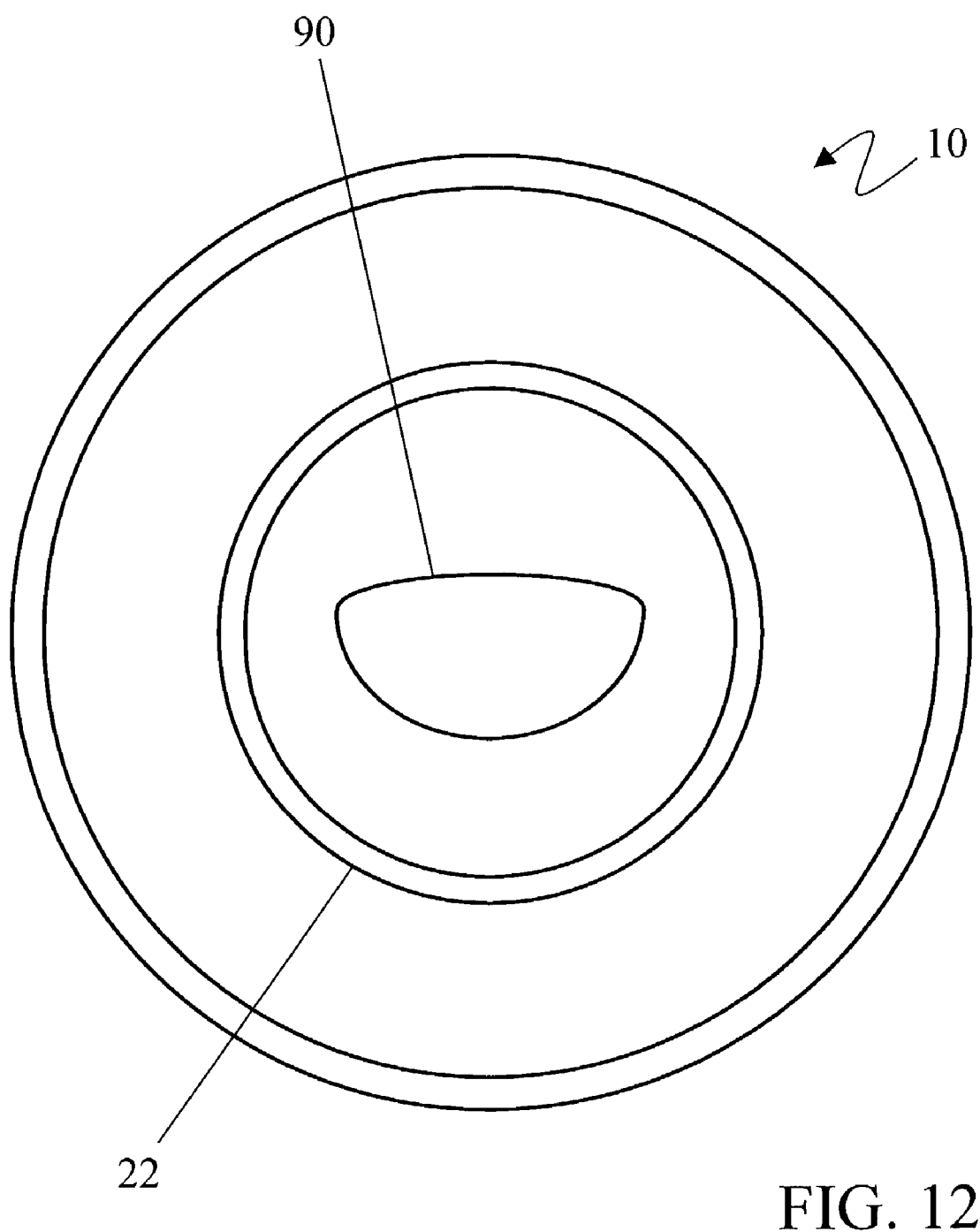
FIG. 12 is an overhead view of a mold with a mold edge emplaced thereon, in accordance with an embodiment of the present invention.
Figure 13:
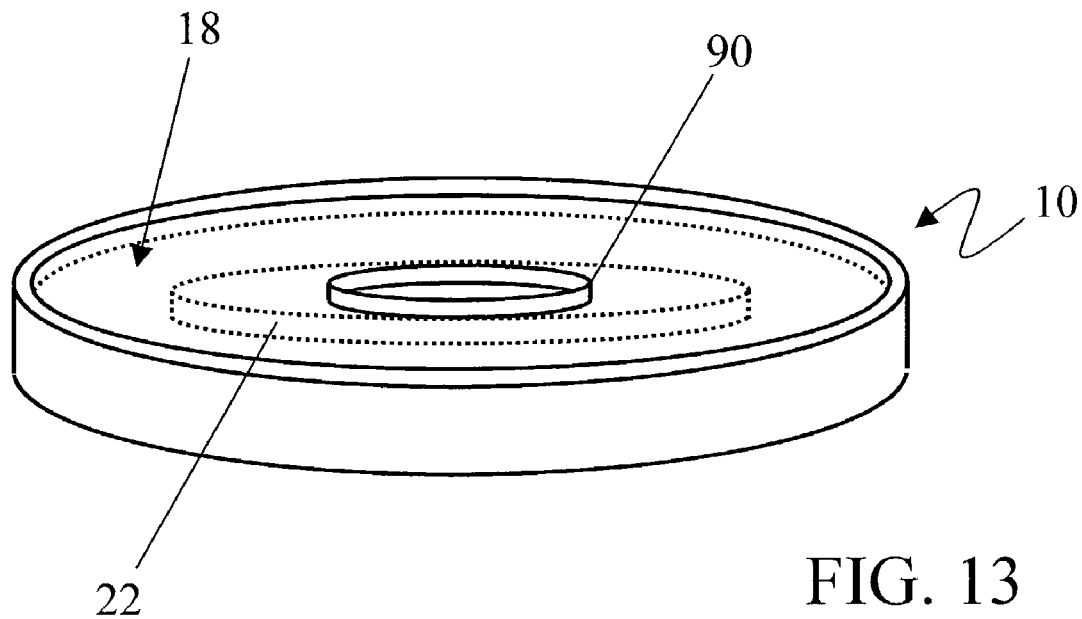
FIG. 13 is a perspective view of the mold of FIG. 12 with the mold edge emplaced thereon.
Figure 14:
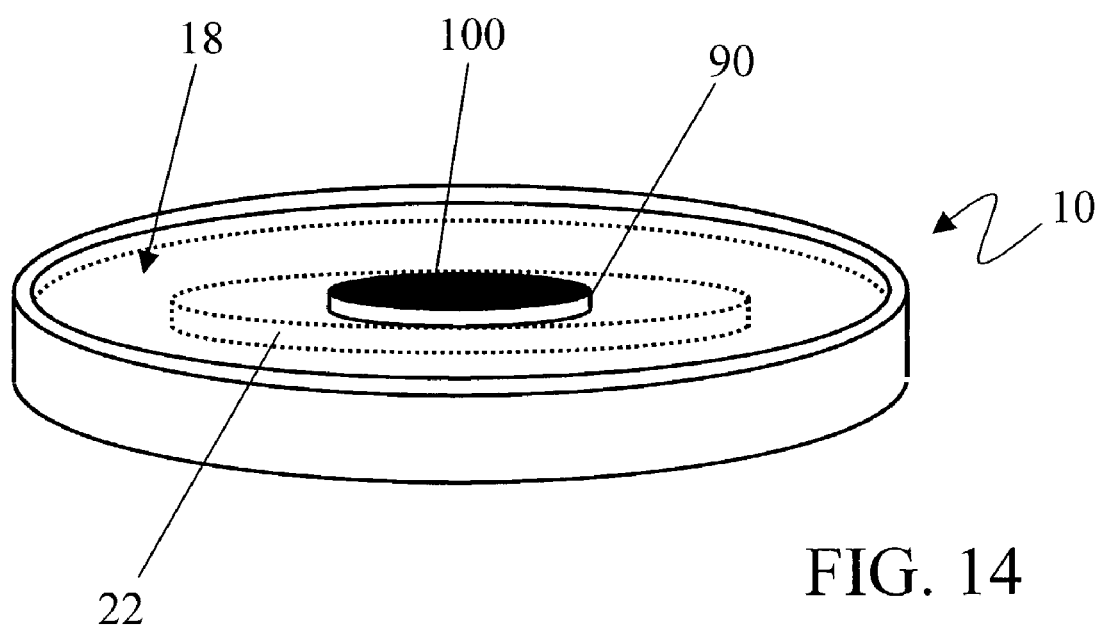
FIG. 14 shows the mold of FIG. 13 with mold edge emplaced thereon with a molding composition deposited on the mold within the mold edge, in accordance with an embodiment of the present invention.

FIG. 12 is an overhead view of a mold 10 with a mold edge 90 emplaced thereon, in accordance with an embodiment of the present invention. FIG. 13 is a perspective view of the mold 10 of FIG. 12 with the mold edge 90 emplaced thereon. FIG. 14 shows the mold 10 of FIG. 13 with mold edge 90 emplaced thereon and with a molding composition 100 deposited on the surface of the flexible membrane 18 of the mold 10 within the mold edge 90, in accordance with an embodiment of the present invention. For example, in one embodiment, to produce eyeglass lenses, the flexible membrane 18 is variably distorted until desired surface characteristics are produced, such as by using the calibration features shown in FIGS. 5 and 11. A molding composition 100 is then placed on the surface of the flexible membrane 18 and cured into a solid, transparent state.

Figure 15:
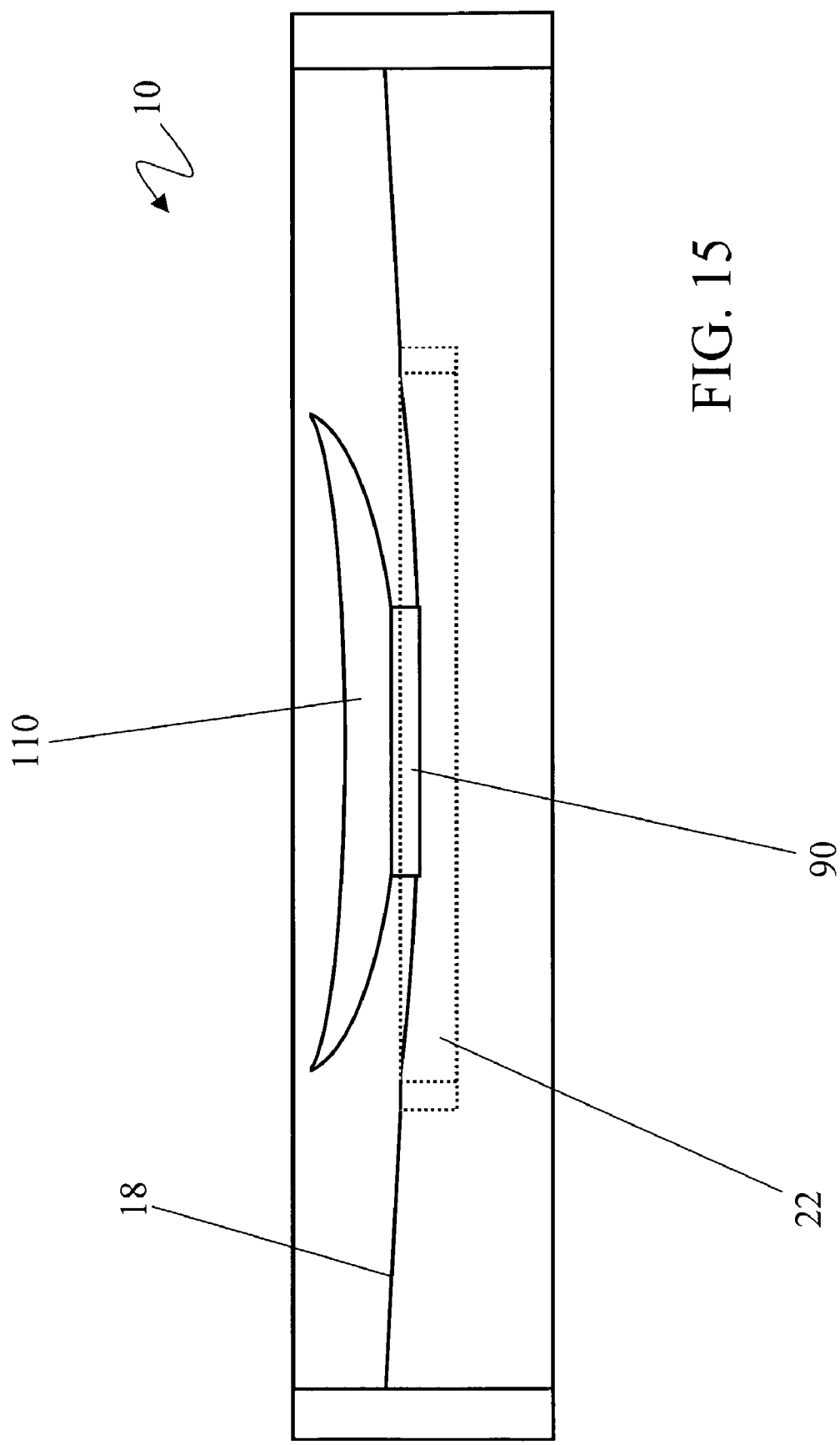
FIG. 15 presents a cross-sectional view of the mold, showing a first example mold edge sandwichably placed between the flexible membrane and a second surface form, in accordance with an embodiment of the present invention.

FIG. 15 presents a cross-sectional view of a mold 10, showing a first example mold edge 90 sandwichably placed between the flexible membrane 18 and a second surface form 110 prior to curing, in accordance with an embodiment of the present invention. The lower surface of the second surface form 110, as shown in FIG. 15, thus imposes an upper surface constraint on the formed item, such as an eyeglass lens produced by curing the molding composition 100 placed on the surface of the flexible membrane 18.

FIG. 16 shows an overhead view of a second example of a mold edge 120, in accordance with an embodiment of the present invention. FIG. 17 is a cross-sectional view of a portion of a side of the mold edge 120 of FIG. 16. For example, in one embodiment, the mold edge 120 is a conformable ring of elastomeric material designed, when placed between the surface of the flexible membrane 18 and the second surface form 110, to produce a desired perimeter shape for the lens or other formed item being cast. Via use of the mold edge 120, little or no grinding and edging of the formed items, such as lenses, are needed following casting.

In an embodiment of the present invention, the cross-sectional shape of the mold edge 120, as shown in FIG. 17, allows the mold edge 120 to act as a bellows in conforming in one direction (e.g., in the vertical direction, as shown in FIG. 17), while demonstrating substantial stiffness in the plane of the formed item (e.g., in the horizontal direction, as shown in FIG. 17) to sufficiently describe the desired perimeter shape of the item cast. In yet another embodiment, the mold edge 120 includes inlet and outlet ports for the introduction of molding composition 100 and for bleeding air bubbles or other undesirable inclusions, respectively. FIG. 18 presents a cross-sectional view of the mold 10, showing the second example mold edge 120 sandwichably placed between the flexible membrane 18 and a second surface form 110, in accordance with an embodiment of the present invention.

Figure 19:
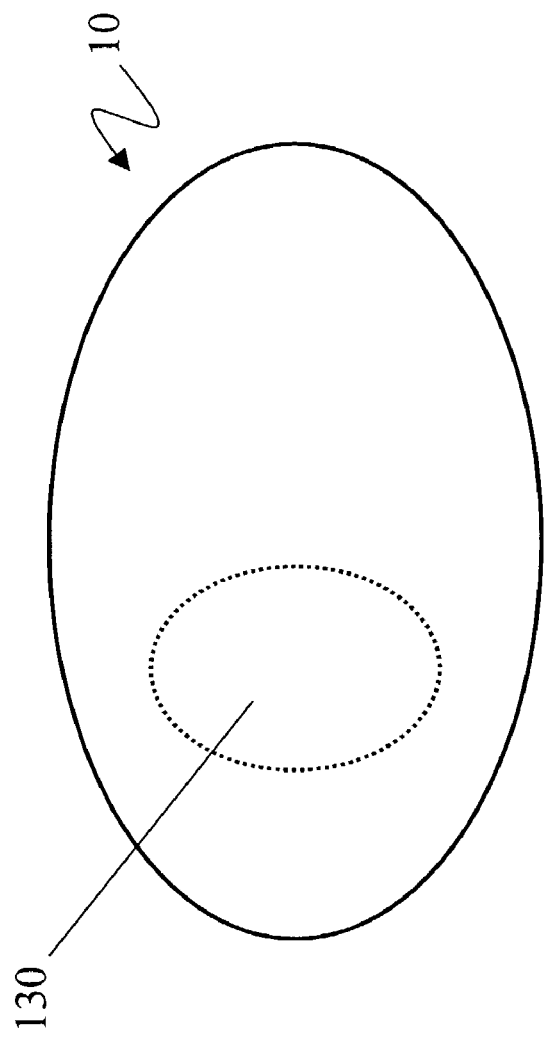
FIGS. 19 and 20 show views of a first example second surface form having a convex protrusion, in accordance with an embodiment of the present invention.
Figure 20:
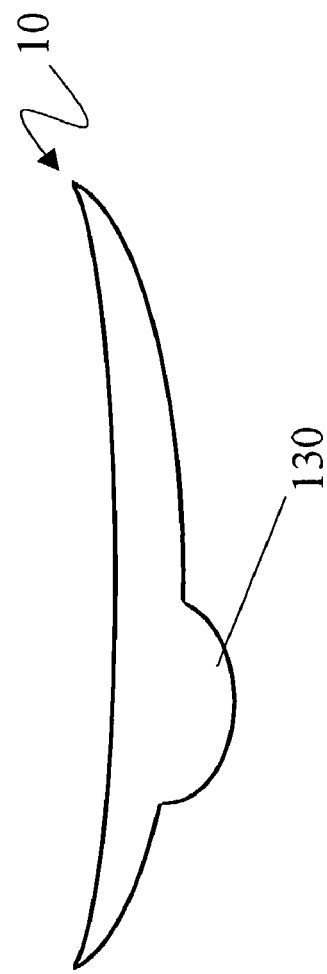

FIGS. 19 and 20 show views of a first example second surface form 110 having a convex protrusion 130, in accordance with an embodiment of the present invention, which produces concave features on the second side of the molded item. FIGS. 21 and 22 contain views of a second example second surface form 110 having a concave depression 140, in accordance with an embodiment of the present invention, which produces convex features on the second side of the molded items.

Thus, as shown, for example, in FIG. 11, once the desired shape and depth of the molding region are achieved, a molding composition 100, typically in liquid form, is applied to the molding region. In the case of eyeglass lenses, the molding composition 100, when cured into a solid state, is transparent. It should be understood, however, that the present invention can be used to mold a wide range of articles, not just eyeglass lenses. For example, any object that would typically be injection molded can benefit from the variation in mold shape afforded by the presented invention. Examples of such objects include, but are not limited to, bottles of varying shape, the outer casings of computer mice, where the ergonomics can thus be tailored to individuals hands, seat bases and backs, where personalization is required, ashtrays, and toys, where no two molded parts would ever be the same (e.g., a face for a doll could be different for every child).

As used herein, the terms annulus and boundary are used interchangeably to describe any element that is distortable in at least one dimension to provide the desired boundary condition when engaged by the flexible membrane 18. By varying the annulus or boundary distortion in three dimensions, a much larger set of surfaces can be 'programmed,' and hence a larger array of objects can be molded, as compared with just a one or two dimensional distortion.

In embodiments of the present invention, the molding composition may be, for example, a curable polymer precursor or other resin, or a glass precursor (such as a sol-gel composition). Polymer curing may occur through, for example, application of a polymerization initiator (e.g., in the case of two-part resins), application of actinic radiation or heat, or simply through drying or solvent evaporation.

Following its application to the molding region, the molding compound is cured. In embodiments of the present invention, once the molded article is removed from the molding region, the knob or other annulus or boundary adjusting features can be adjusted quickly to create a molding region affording production of, for example, a lens with different optical properties. The removed molded article may then be subjected to any desired post-processing procedures (e.g., annealing or coating) to create the finished lens product. Substantially all of the resulting lens is useable for its intended purpose. Only a very small area along the edge of the lens where a meniscus may form during the curing process may be unusable.

Figure 23:
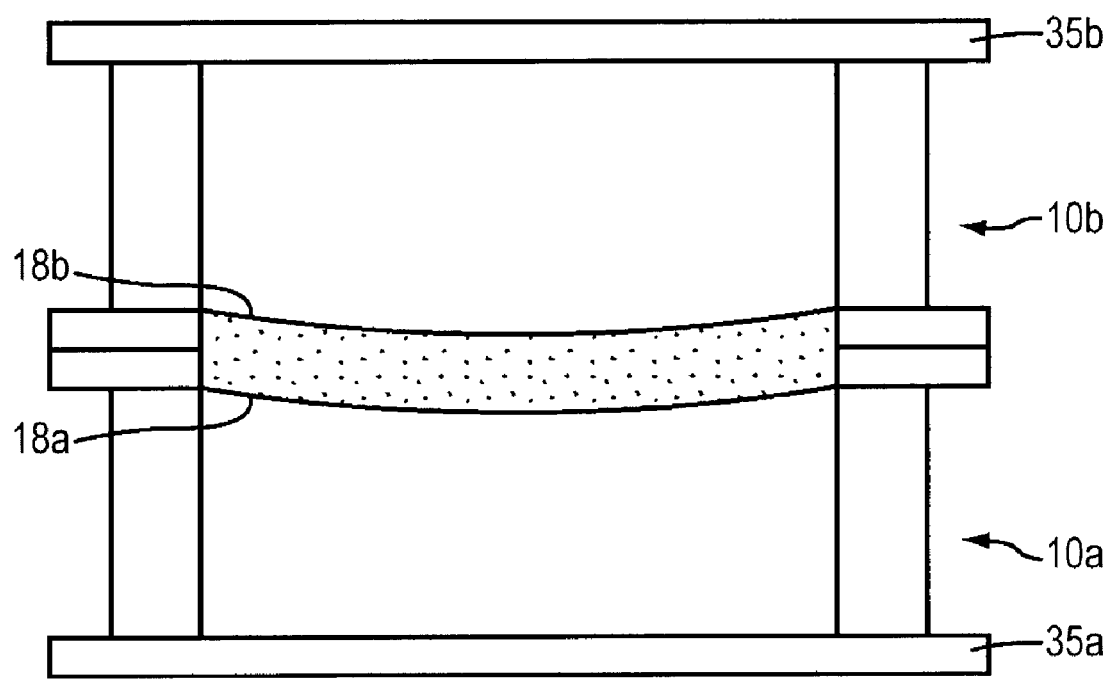
FIG. 23 is a side view of a two mold embodiment of the present invention.

With reference to FIG. 23, in still another embodiment, a second mold 10b, having a flexible membrane 18b and a bottom wall 35b is used to create a depth profile on an upper surface of the lens (because the flexible membrane 18a only determines the depth profile of the lower surface); without such a mold or other molding feature (e.g., a second surface form, as described above with respect to, for example, FIGS. 15 and 18), the upper surface will be substantially flat. In accordance with this embodiment, following addition of the molding composition to the molding region, the second form 10b, which is volumetrically complementary to the desired top-surface depth profile, is stacked upon first mold 10a. If necessary, pressure is applied to the second mold 10b to maintain the desired depth profile during curing. Once the desired shape is achieved, the precursor is cured and the lens thereby formed.

FIGS. 24 and 25 present views of an item mold 10 having complex boundary conditions, in accordance with an embodiment of the present invention. For example, FIG. 26 shows a view of the item mold 10 of FIGS. 24 and 25, in which a positive pressure is applied via a complex mold edge 160 to a positively pressurized flexible membrane 18, in accordance with an embodiment of the present invention.

EXAMPLES

The mold 10 was used as the inverse of the resulting lens to determine the shape of the resulting lens being cast, and as a consequence, as described above, its optical properties. In a first example, a lens was made having optical properties that were substantially +1.00 sphere, −0.50 astigmatism. After adjusting the boundary 22 and generating the appropriate pressure differential within the chamber 36, a polymer, allyl diglycol carbonate sold under the trademark CR-39 (a standard lens casting plastic developed by Columbia Laboratories and distributed by PPG Industries Ohio, Inc, 3800 West 143rd Street Cleveland Ohio 44111), was applied to the flexible membrane 18 and cured with a heat lamp.

In a second example, a lens having a +3.50 sphere, −0.75 astigmatism was created using the same process. In a third example, a lens having a straight +5 sphere was also created with the above-described process.

Example embodiments of the present invention have been described in accordance with the above advantages. It will be appreciated that these examples are merely illustrative of the invention. Many variations and modifications will be apparent to those skilled in the art.

What is claimed is:

1. A method of forming a lens, the method comprising:
    disposing a flexible membrane having a surface over a boundary having a boundary rim and a distortable shape;
    applying a lens precursor to the surface of membrane;
    applying to the lens precursor a form having an exterior profile;
    selectively distorting the shape of the boundary such that a cross sectional shape of an interior defined by the boundary is distorted;
    selectively applying pressure to the membrane using a fluid in contact with the membrane so as to distort the surface of the membrane; and
    curing the precursor into a lens having opposed depth profiles dictated by the membrane and the form.

2. The method of claim 1, wherein the pressure is negative.

3. The method of claim 1, wherein the pressure is positive.

4. The method of claim 1, wherein the lens precursor is a polymer precursor.

5. The method of claim 1, wherein the lens precursor is cured to form a glass.

6. The method of claim 1, further comprising:
    disposing a mold edge on the surface of the membrane, wherein the mold edge has a circumferential shape encompassing at least a portion of the interior region of the distortable boundary.

7. A method of forming a molded lens, comprising the steps of:
    adjusting an adjustably distortable boundary of a mold such that an interior region defined by the adjustably distortable boundary has a desired cross sectional shape, the mold further comprising a flexible membrane having a first surface, the adjustably distortable boundary being in contact with flexible membrane, the mold further comprising a pressurizer for variably applying pressure upon the first surface of the flexible membrane;
    introducing a fluid into the interior region;
    applying a desired pressure upon the flexible membrane using the fluid;
    applying a lens precursor to a second surface of the membrane;
    applying to the lens precursor a form having an exterior profile;
    curing the precursor into a lens having opposed depth profile dictated by the membrane and the form.

8. The method of claim 7, wherein the mold further comprises a mold edge abuttably placeable upon the second surface of the flexible membrane.

9. The method of claim 8, wherein the mold edge includes an inlet port and an outlet port.

10. The method of claim 8, wherein the molded lens has at least one side, and wherein the mold edge forms the at least one side of the molded item.

11. The method of claim 10, wherein the mold edge forms the molded lens in a shape of a lens for a pair of glasses.

12. The method of claim 8, wherein the mold edge has a cross-sectional shape that performs as a bellows in a first direction and has increased rigidity in a second direction.

13. The method of claim 8, wherein the mold further comprises a second surface form abuttably placeable upon the mold edge.

14. The method of claim 13, wherein the molded lens has a first surface portion formed by the flexible membrane, and a second surface portion oppositely disposed the first surface portion.

15. The method of claim 14, wherein the second surface portion of the molded lens is formed by the second surface form.

16. The method of claim 13, wherein the second surface form includes a surface variation.

17. The method of claim 16, wherein the surface variation includes a convex protrusion.

18. The method of claim 16, wherein the surface variation includes a concave depression.

19. The method of claim 16, wherein the surface variation is usable to form a bifocal portion of the molded lens.

20. The method of claim 13, wherein the second surface form comprises a flexible membrane.

21. The method of claim 20, wherein the second surface form flexible membrane is variably distortable.

22. The method of claim 21, wherein the second surface form flexible membrane is variably distortable by the pressurizer.

23. The method of claim 21, wherein the second surface form flexible membrane is variably distortable by a second surface form pressurizer.

24. The method of claim 7, wherein the mold further comprises a second boundary abuttably placeable in contact with the flexible membrane.

25. The method of claim 24, wherein the adjustably distortable boundary has a circumscribed portion, and wherein the second boundary is locatable within the circumscribed portion of the adjustably distortable boundary.

26. The method of claim 7, further comprising a chamber enclosing the adjustably distortable boundary.

27. The method of claim 26, wherein the flexible membrane forms one wall of the chamber.

28. The method of claim 7, wherein the mold further comprises:
    at least one adjusting mechanism for adjustably distorting the adjustably distortable boundary.

29. The method of claim 28, wherein the adjustably distortable boundary includes at least one threaded opening, and wherein each of the at least one adjusting mechanism includes a threaded portion matable with a corresponding one of the at least one threaded opening of the adjustably distortable boundary.

30. The method of claim 29, wherein each of the at least one adjusting mechanism is rotatable, and wherein rotation of each of the at least one adjusting mechanism produces stress distortion of the adjustably distortable boundary via the corresponding one of the at least one threaded opening of the adjustably distortable boundary.

31. The method of claim 7, further comprising:
    an emission device, wherein an emission by the emission device is directable through the flexible membrane.

32. The method of claim 31, wherein the emission device is a laser.

33. The method of claim 32, wherein the mold further comprises:
an alignment guide, wherein the emission is directable through the alignment guide and the flexible membrane.

34. The method of claim 33, further comprising:
a projection plane upon which the emission is directable so as to reflect a projection image thereon.

35. The method of claim 34, wherein the projection plane has a calibration reference image placed thereon, the calibration reference image being superimposedly comparable to the projected image.

36. The method of claim 31, wherein distortion of the flexible membrane by the pressurizer distorts the emission passing through the flexible membrane.

37. The method of claim 7, wherein the mold further comprises:
a protection plane having a calibration reference image thereon, the calibration reference image being viewable through the flexible membrane.

38. The method of claim 37, wherein the mold further comprises:
a device containing an image pattern situated such that the calibration reference image viewed through the flexible membrane is superimposedly viewable with the image pattern.

39. The method of claim 38, wherein the device containing the image pattern comprises a reticle.

40. The method of claim 37, wherein distortion of the flexible membrane by the pressurizer distorts the calibration reference image viewed through the flexible membrane.

41. The method of claim 7, wherein the lens precursor comprises a fluid.

42. The method of claim 41, wherein the lens precursor is cured using a curing device.

43. The method of claim 42, wherein the curing device emits ultraviolet light.

* * * * *